March 30, 1965 — C. G. SEASHORE — 3,175,463
REAR VIEW MIRROR HAVING PLANE AND CONVEX REFLECTING SURFACES
Filed July 6, 1961 — 2 Sheets-Sheet 1
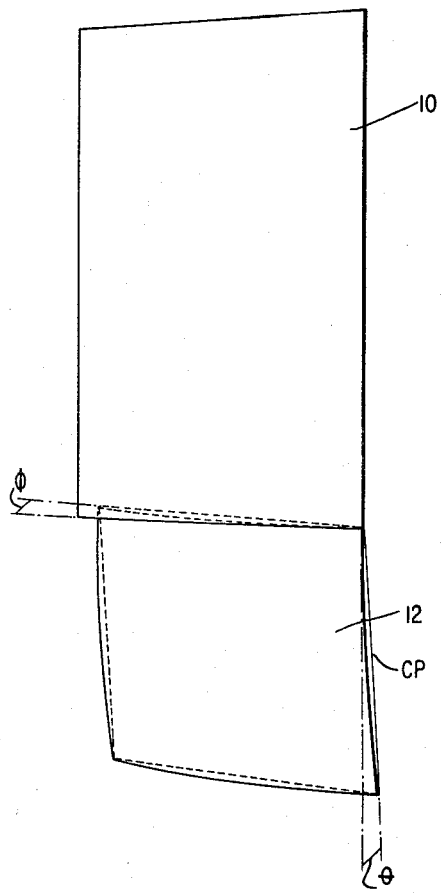
FIG.1
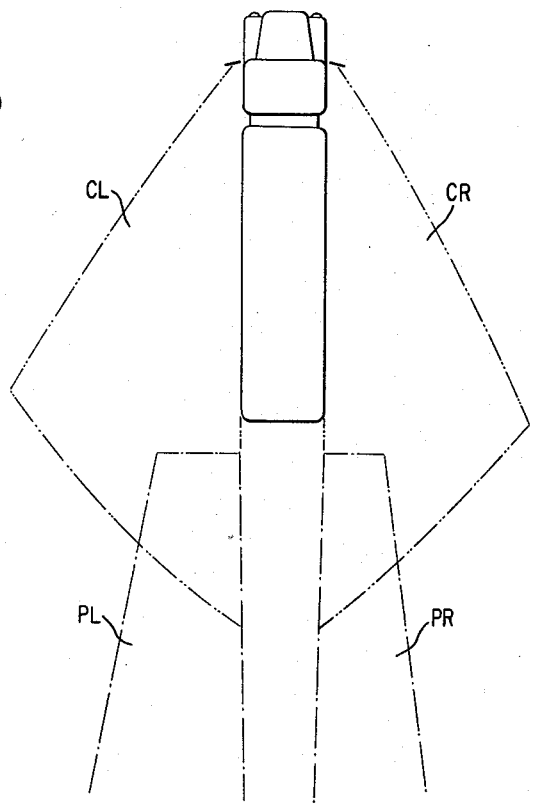
FIG.2
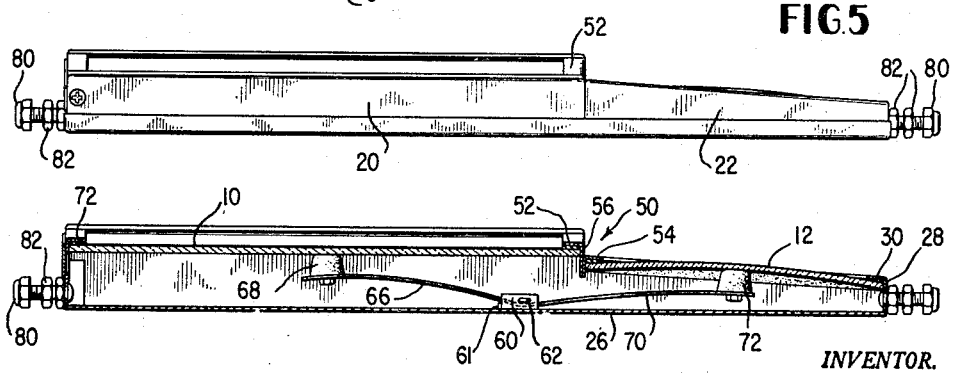
FIG.5
FIG.6
INVENTOR.
CARL G. SEASHORE
BY
ATTORNEYS March 30, 1965   C. G. SEASHORE   3,175,463
REAR VIEW MIRROR HAVING PLANE AND CONVEX REFLECTING SURFACES
Filed July 6, 1961   2 Sheets-Sheet 2
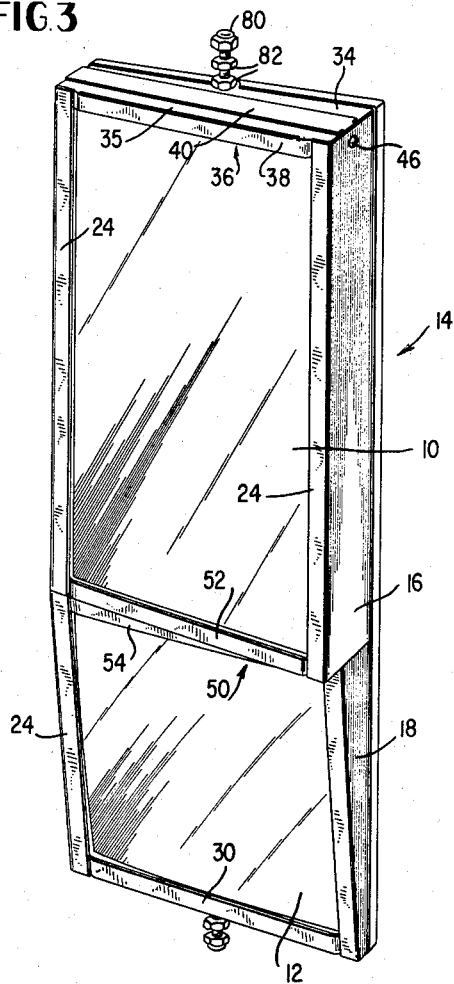
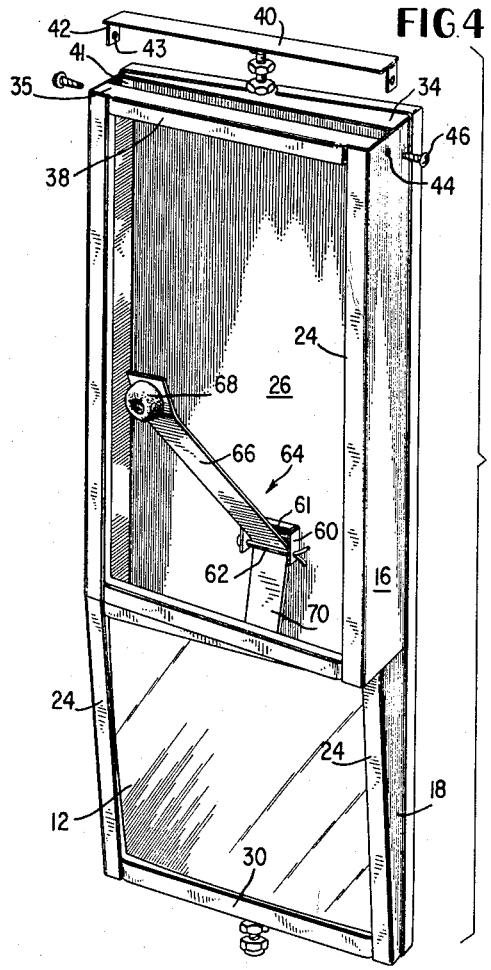
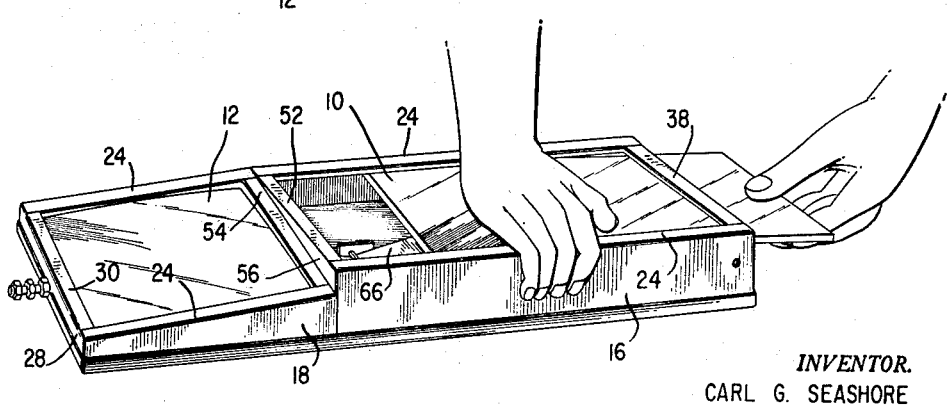
INVENTOR.
CARL G. SEASHORE
BY
*ATTORNEYS*

United States Patent Office 3,175,463
Patented Mar. 30, 1965

3,175,463
REAR VIEW MIRROR HAVING PLANE AND
CONVEX REFLECTING SURFACES
Carl G. Seashore, 7341 Ash, Prairie Village, Kans.
Filed July 6, 1961, Ser. No. 122,203
1 Claim. (Cl. 88—87)

This invention relates generally to mirrors, and more particularly to a side mirror for vehicles which eliminates those blind spots encountered with ordinary side mirrors to which many traffic accidents have been attributed in recent years.

A huge number of side and rear view mirrors for vehicles have been devised in the past, many of which are composed of a plurality of faces, and almost all of which are complex and bulky. Furthermore, the sheer number of mirror faces with which a viewer is encountered presents a significant problem of properly coordinating this multitude of information while at the same time performing the usual driving tasks. Also, all of these prior mirrors have provided blind spots in the driver's side and rear vision which areas are critical and must be seen by a driver for safe driving.

With these defects of the prior art in mind, it is a main object of this invention to provide a multi-face side mirror for vehicles, such as trucks or the like, wherein two separate fields of view are provided; one for long distance viewing and one for close up viewing, with the fields of view overlapping somewhat so that the driver of the vehicle is provided with a continuous field of vision to the side and rear.

Another object of the invention is to provide a driver with vision of the lane alongside his vehicle for a considerable length rearwardly thereof as well as into the next lane over for at least a short distance, so that vehicle movements in such lanes will be easily and readily visible to the driver.

A further object of the invention is to provide a driver with vision into the second lane over from his vehicle in those areas not very far rearwardly of the vehicle so that the driver may see people and objects such as cars which might interfere with movement of his vehicle either immediately or in some future instant.

Still a further object is to provide a side view mirror which is designed for use by a large number of drivers having different physical characteristics, such as height and the like, and to provide these drivers with substantially similar fields of view with little or no adjustment of the mirror being necessary.

Yet a further object of the invention is to provide a mirror wherein even during a ninety degree turn, which is noted to be one of the most dangerous maneuvers during driving, a driver may see to the side and rearwardly so that even during turning of the vehicle, this mirror provides the driver with a sufficiently large field of vision to substantially reduce the danger thereof.

Yet a further object of the invention is to provide a mirror wherein changes of location of the driver's eyes, as occurs when different persons drive the same vehicle, has a minimal effect on the size and location of the field of view in the mirror.

These objects and others ancillary thereto are accomplished according to a preferred embodiment of the invention, which may be described as a side mounted rear view mirror for road vehicles which comprises a mirror assembly and mounting means to permit said assembly to be positioned on a side of the vehicle outside of and adjacent the vehicle driver's compartment to provide the driver with a field of view to the rear of the vehicle, said assembly including a plane long view mirror, a convex short view mirror having top, bottom, inner and outer edges relative to the vehicle, said convex mirror being curved both horizontally and vertically, and a frame retaining said mirrors in fixed relation to each other in said assembly with said convex mirror positioned below said plane mirror and the chord plane which passes through said edges of said convex mirror being inclined relative to the plane mirror with the outer and lower edges of said convex mirror extending toward the front of the vehicle so that the driver's view of the ground surface in said convex mirror extends forward and outside relative to the vehicle of the driver's view of the ground surface in the plane mirror, the plane of said plane mirror being non inclined relative to a plane tangent to said convex mirror at a location in the upper inside quadrant of said convex mirror spaced from the upper and inner edges of said convex mirror so that the forward end of said view of the ground surface in said plane mirror slightly overlaps with the rear inner corner of said view of the ground surface in said convex mirror, whereby the image seen by the driver of an object approaching along the ground from the rear of the vehicle appears first only in said plane mirror, moves down said plane mirror until it appears momentarily in both said mirrors and then appears only in said convex mirror.

The mirror sections are mounted in a unitary frame having a resilient material engaging the peripheries of the mirrors to protect them from engagement with the frame which is preferably formed of metal. A strong spring is provided on the back of the frame and has rubber cushions on the ends thereof which engage the mirrors and hold them firmly in place to prevent rattling or vibration. The spring may be formed of strap metal and bent into a V-shape and held in position against the back of the frame. The rubber cushions are disposed at either end of the strap, so that the V spring has its legs urged apart during insertion of the mirrors whereupon the spring exerts pressure against the mirrors by attempting to conform to its original position with the legs closer together.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a schematic perspective view of the mirror sections themselves, with the relative positions therebetween and angles thereof being indicated;

FIG. 2 is a schematic representation in plan of a tractor-trailer having the side mirrors comprising the present invention attached to either side of the cab, with the field of view at ground level being indicated in dot-dash lines for both mirror sections;

FIG. 3 is a perspective view of the mirror sections in the unitary frame with all parts being connected together;

FIG. 4 is a semi-exploded view with the upper plane mirror being removed for purposes of clarity to illustrate the spring;

FIG. 5 is a side elevational view of the mirror;

FIG. 6 is a vertical sectional view of the mirror, and

FIG. 7 is a perspective view illustrating the manner of removing the mirrors from the frame.

With more particular reference to the drawings, numeral 10 indicates the plane mirror section, and 12 designates the spherically convex mirror section. The dash lines illustrated in connection with mirror section 12 designate the chord plane of this section which passes through the apices or corners of the mirror, and this plane is illustrated for purposes of clarity in considering the relative disposition of this mirror with respect to the plane mirror. The diagrammatic representation of the mirror sections in FIG. 1 is that of a left side mirror. In such a mirror the chord plane of section 12 is disposed at an angle φ with respect to the plane of plane mirror section 10 when viewed from above, while the chord plane of section 12 is at an angle θ with respect to the plane of mirror section 10 when viewed from the side. Thus, an imaginary line at right angles to the chord plane of the convex mirror section, which passes through the apices or corners thereof, is disposed outwardly and downwardly with respect to an imaginary line at right angles to the plane mirror.

With more particular reference to FIG. 2, those portions of the pavement which are in the fields of view of a driver are indicated. The field of view of the left convex mirror is indicated by CL and can clearly be seen to cover several lanes to the left of the vehicle and to extend for a distance somewhat to the rear of the vehicle. The view provided by the left plane mirror is indicated as PL, and only the forward portion thereof has been indicated, since this mirror will be so positioned that the rear field of vision is the horizon as is done with most side view mirrors. It may be seen that at the forward portion of this field of vision, the area included is just slightly greater than one lane, and increases rearwardly, with the rearwardmost portion of area CL and the forwardmost portion of area PL overlapping for some distance so that a vehicle approaching from the rear may be continuously under surveillance by the driver of the vehicle. Corresponding areas on the right side of the vehicle obtained by peering into the right side mirror, are indicated as CR and PR, respectively.

The frame 14 is constructed having a side wall 16, the upper portion of which is disposed somewhat outwardly of its lower portion 18 due to the relative positions of the two mirrors as explained in connection with FIG. 1. The other side of frame 14 is composed of side walls 20 and 22, which are substantially in alignment, but, wherein the lower wall 22 projects somewhat inwardly of the mirror, again due to the relative positions of the mirror sections as explained in connection with FIG. 1. Each of these side walls has a flange 24 which will be used in a manner explained in detail below for properly retaining the mirror in the desired position. The frame has a solid single piece back 26 connected to a bottom 28, which is provided with a lower flange 30. The upper end of the back is connected to a top plate 34.

Metal plate 34 is connected at the upper end of the frame and is trapezoidal in shape in order to conform to the shape of the upper end of the frame, and to provide the remainder of the upper end of the frame with a rectangular opening. A corner piece 36 is inserted into the forward end of this opening and connected to the side walls of the frame, and has a plate 35 and a flange 38 for engaging the mirror. A removable plate 40 having depending right angled ears 42 is inserted over plates 34 and 35, with ears 42 extending downwardly into the interior of the frame. Openings 43 are formed in the ears and when the plate 40 is inserted into the frame, these openings coincide with openings 44 in the frame walls so that screws 46 may be used to secure this plate in place, it being noted that opening 43 is for this purpose tapped to engage the threads of screws 46.

Between the top and the bottom ends of the frame, an intermediate supporting piece 50 is provided which has an upper flange 52 for the upper mirror and a lower flange 54 for the lower mirror. Furthermore, this member is bent in the middle so that a triangular shaped portion 56 is provided which may be seen from the bottom of the frame, as clearly indicated in FIG. 7. This portion is provided to close the overlapping part of the upper portion of the frame.

At a point disposed upwardly from intermediate member 50, a pair of ears 60 are secured to the interior surface of frame back 26, and are provided with aligned openings through which a cotter pin 62 may be secured. A V-shaped leaf spring 64 is removably secured between the ears by means of cotter pin 62 engaging the apex thereof. The upper leg of the spring 66 has a cushion 68 attached to the upper end thereof, which may be formed of rubber or the like, and which extends behind the upper plane mirror section. The lower leg 70 of this spring has a cushion 72 of the same material as cushion 68, which extends behind the lower spherically convex mirror section.

The interior of all of the flanges 24, 38, 52, and 54 are lined with a resilient material such as styrene plastic sponge material 72 to protect the mirror surfaces and prevent rattling. When plate 40 is removed from the frame, the lower spherically convex mirror section 12 may be inserted through opening 41 defined between plates 34 and 36, and placed into the position shown in FIG. 4. Then, the device is placed on its back as shown in FIG. 7 and some type of lubrication added to cushion 68, such as an aqueous soap solution or the like, so that the plane mirror 10 may be slid into place as shown in FIG. 7 with pressure being exerted upon that portion of the mirror overlying the rubber cushion in order to allow the mirror to pass under the edge of plate 35. As shown in FIGS. 4 and 6, a supporting abutment means 61 is preferably provided underlying the spring leg 66 so that the stress of bending said leg is received by pin 62 and abutment 61 is not transmitted to urge the leg 70 toward the convex mirror 12 with undue force. The lubrication is desirable or needed so that the mirror may slide freely over the cushion without tearing the mirror backing.

Any desired type of attacking means for connecting the mirror to a truck may be used, such as the bolts 80 and the nuts 82 threaded thereon, by means of which these mirrors may be connected to the rectangular frame provided on the cabs of most trucks.

It should now be apparent that the mirror which is provided will permit the driver of the vehicle to scan areas to the rear and to either side of the vehicle which are of critical importance in viewing approaching and overtaking traffic. The present invention permits viewing areas comparatively far to the rear of the vehicle as with conventional plain mirrors as well as the area close behind the cab. An optimum distance to the rear approximating the legal length of vehicle combinations is visible to the driver, and this includes an area more than one traffic lane in width.

In a typical application, the upper or plane rectangular mirror will be about six by ten inches whereas the lower segment will be a square of six inches. Angles θ and φ preferably will vary from four to six degrees and the radius of the spherically convex mirror section 12 will vary from twenty-four to thirty-six inches, which is the approximate distance between a driver's eyes and the left side mirror. Because of the relatively large radius compared to the relatively small six by six section of mirror, distortion of the area viewed by the mirror is kept to a minimum.

With reference to FIG. 2, it should be noted that the viewing areas designated thereon represent the field of view at pavement level. Thus, for example, if another vehicle were to approach from the rear in the lane adjacent to the tractor-trailer combination, it would be visible to the driver through the upper plane mirror section when this vehicle was more than fifty feet to the rear of the cab. When it was thirty to forty feet to the rear, the vehicle would not be visible to the driver through the upper plane mirror. At this point, however, the approaching vehicle would be crossing the trailing edge of the viewing area CL and thus the approaching vehicle would be visible to the driver from one section of the mirror or the other from a distance very far to the rear and up to a point nearly abreast with the cab where the driver's direct visual control may be used. Of course, the forwardmost edges of the areas CL and PL, and CR and PR are not exactly indicative of where an approaching vehicle will move out of the field of vision, since this vehicle will be disposed somewhat above the ground, and therefore will be visible somewhat forwardly of the forward lines of these areas which are designated for ground level only. Also, when the approaching vehicle is forty to fifty feet to the rear of the cab, it will be visible through both the mirror sections. The mirror includes such large fields of vision that making any complicated maneuvers such as turns or the like, are much safer due to larger field being visible than had ever before been visible with side view mirrors.

The foregoing is considered only as illustrative of the principles of the invention. Further, since numerous minor modifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is:

A side mounted rear view mirror for road vehicles which comprises a mirror assembly and mounting means to permit said assembly to be positioned on a side of the vehicle outside of and adjacent the vehicle driver's compartment to provide the driver with a field of view to the rear of the vehicle, said assembly including a plane long view mirror, a convex short view mirror having top, bottom, inner and outer edges relative to the vehicle, said convex mirror being curved both horizontally and vertically, and a frame retaining said mirrors in fixed relation to each other in said assembly with said convex mirror positioned below said plane mirror and the chord plane which passes through said edges of said convex mirror being inclined relative to the plane mirror with the outer and lower edges of said convex mirror extending toward the front of the vehicle so that the driver's view of the ground surface in said convex mirror extends forward and outside relative to the vehicle of the driver's view of the ground surface in the plane mirror, the plane tangent to said convex mirror at a location in the upper inside quadrant of said convex mirror spaced from the upper and inner edges of said convex mirror so that the forward end of said view of the ground surface in said plane mirror slightly overlaps with the rear inner corner of said view of the ground surface in said convex mirror, whereby the image seen by the driver of an object approaching along the ground from the rear of the vehicle appears first only in said plane mirror, moves down said plane mirror until it appears momentarily in both said mirrors and then appears only in said convex mirro.

References Cited by the Examiner
UNITED STATES PATENTS

| | | | |
|---|---|---|---|
| Re. 17,274 | 4/29 | Porter | 88—105 |
| 582,724 | 5/97 | Dromgoole. | |
| 1,114,559 | 10/14 | Weed | 88—87 |
| 1,688,018 | 10/28 | Oestnaes | 88—78 |
| 1,887,144 | 11/32 | Wilczynski | 88—105 |
| 2,279,751 | 4/42 | Hensley | 88—87 |
| 2,493,546 | 1/50 | Orser | 88—87 |
| 2,695,470 | 11/54 | Rosenberg et al. | 40—152 |
| 2,849,920 | 9/58 | Morgenstern | 88—98 |
| 2,851,926 | 9/58 | Beach | 88—98 |
| 2,890,539 | 6/59 | Holt | 40—152 |
| 2,990,751 | 7/61 | Miller | 88—87 |
| 3,009,392 | 11/61 | Snell | 88—87 |
| 3,028,794 | 4/62 | Kinkella | 88—87 |
| 3,044,359 | 7/62 | Zanetti-Streccia | 88—86 |

JEWELL H. PEDERSEN, *Primary Examiner.*

EMIL G. ANDERSON, *Examiner.*

UNITED STATES PATENT OFFICE
CERTIFICATE OF CORRECTION

Patent No. 3,175,463

March 30, 1965

Carl G. Seashore

It is hereby certified that error appears in the above numbered patent requiring correction and that the said Letters Patent should read as corrected below.

Column 6, line 3, before "tangent" insert -- of said plane mirror being non inclined relative to a plane --; line 13, for "mirro" read -- mirror --.

Signed and sealed this 22nd day of February 1966.

(SEAL)
Attest:

ERNEST W. SWIDER
Attesting Officer

EDWARD J. BRENNER
Commissioner of Patents